United States Patent
Ansari et al.

(10) Patent No.: US 11,876,158 B2
(45) Date of Patent: Jan. 16, 2024

(54) METHOD AND SYSTEM FOR AN ULTRA-HIGH VOLTAGE COBALT-FREE CATHODE FOR ALKALI ION BATTERIES

(71) Applicant: Enevate Corporation, Irvine, CA (US)

(72) Inventors: Younes Ansari, Irvine, CA (US); Liwen Ji, San Diego, CA (US); Jill Renee Pestana, Long Beach, CA (US); Benjamin Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 93 days.

(21) Appl. No.: 16/452,245

(22) Filed: Jun. 25, 2019

(65) Prior Publication Data

US 2020/0411895 A1     Dec. 31, 2020

(51) Int. Cl.
| | |
|---|---|
| *H01M 10/04* | (2006.01) |
| *H01M 10/054* | (2010.01) |
| *H01M 4/136* | (2010.01) |
| *H01M 4/04* | (2006.01) |
| *H01M 4/58* | (2010.01) |

(52) U.S. Cl.
CPC ........ *H01M 10/049* (2013.01); *H01M 4/0459* (2013.01); *H01M 4/136* (2013.01); *H01M 4/58* (2013.01); *H01M 10/054* (2013.01); *H01M 4/0404* (2013.01)

(58) Field of Classification Search
None
See application file for complete search history.

(56) References Cited

U.S. PATENT DOCUMENTS

| | | | |
|---|---|---|---|
| 7,838,148 B2 | 11/2010 | Nakaoka | |
| 9,463,984 B2 | 10/2016 | Sun et al. | |
| 2015/0037679 A1* | 2/2015 | Barker | H01M 4/525 |
| | | | 429/231.2 |
| 2019/0027746 A1 | 1/2019 | Barker et al. | |
| 2020/0266478 A1* | 8/2020 | Castro | H01M 10/052 |
| 2021/0280952 A1* | 9/2021 | Wakimoto | H01M 10/058 |

OTHER PUBLICATIONS

Sun et al. (WO 2019/017736) (Jan. 24, 2019) (Year: 2019).*

(Continued)

*Primary Examiner* — Carmen V Lyles-Irving
(74) *Attorney, Agent, or Firm* — McAndrews, Held & Malloy, Ltd.

(57) ABSTRACT

Systems and methods for an ultra-high voltage cobalt-free cathode for alkali ion batteries may include an anode, a cathode, and a separator, with the cathode comprising an active material $ANi_{(1-x)}Mn_xSbO_y$, where x is a number between 0.0 and 1.0, y is an integer, and A comprises one or more of lithium, sodium, and potassium. The anode may include one or more of an alkali metal, silicon, and carbon. In one example, x is a value in the range between 0.05 and 0.9 and y is a value in the range between 1 and 8 where a specific capacity of the active material is greater than 50 milliamp-hours per gram. In another example, x is a value in the range between 0.4 and 0.6 and y is a value in the range between 1 and 8, where a specific capacity of the active material is greater than 70 milliamp-hours per gram.

25 Claims, 6 Drawing Sheets

(56) References Cited

OTHER PUBLICATIONS

PCT, Notification of Transmittal of the International Search Report and the Written Opinion of the International Searching Authority, or the Declaration in International Application No. PCT/US20/39509, dated Sep. 20, 2020 (7 pages).
American Chemical Society; ACS Appl. Mater. Interfaces 2018, 10, 16561-16571: Effects of Nanofiber Architecture and Antimony Doping on the Performance of Lithium-Rick Layered Oxides: Enhancing Lithium Diffusivity and Lattice Oxygen Stability; Yu, Ruizhi et al.; www.acsami.org.
T. Tao et al., Antimony doped tin oxide-coated $LiNi0.5Co0.2Mn0.3O2$ cathode materials with enhanced electrochemical performance for lithium-ion batteries, Journal of Alloys and Compounds, 2018, 765, pp. 601-607.
J. Yu, et al., The investigation of $LiCo1-xSbxO2$ as a promising cathode material for lithium-ion batteries, Electrochimica Acta 121 (2014), pp. 301-306.
G. Fey et al., The Electrochemical Behavior of LiFePO4/C Cathode Materials Doped with Antimony, World Electric Vehicle Journal vol. 4, Nov. 5-9, 2010, pp. 427-436.
P. Cui et al., Preparation and characteristics of Sb-doped LiniO2 cathode materials for Li-ion batteries, Journal of Physics and Chemistry of Solids, 72 (2011), pp. 899-903.

\* cited by examiner

METHOD AND SYSTEM FOR AN ULTRA-HIGH VOLTAGE COBALT-FREE CATHODE FOR ALKALI ION BATTERIES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for an ultra-high voltage cobalt-free cathode for alkali ion batteries.

BACKGROUND

Conventional approaches for battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for an ultra-high voltage cobalt-free cathode for alkali ion batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

Figure 1:
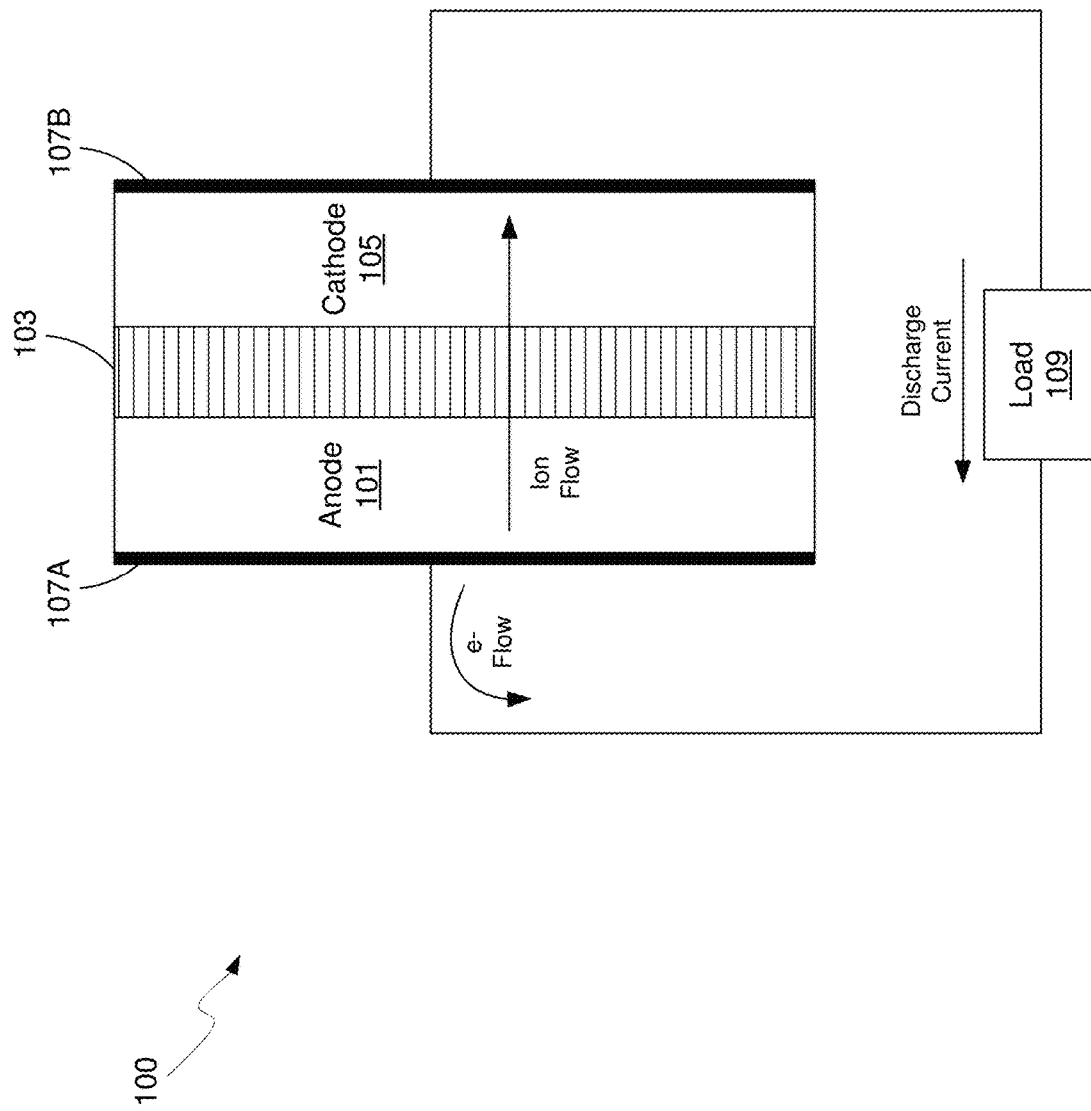
FIG. 1 is a diagram of a battery with an ultra-high voltage cobalt-free cathode, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The anode 101 and cathode 105, along with the current collectors 107A and 107B may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise an alkali metal, silicon, carbon, or combinations of these materials, for example. In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries needs to be improved in order to compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

Common high-energy commercial layered-structure cathodes, like Ni-rich lithium nickel manganese cobalt oxide (NMC) and Ni-rich lithium nickel cobalt oxide (NCA), achieve specific capacities in the range of 150 to 200 mAh/g with moderate charge upper cut-off voltages of about 4.2V. Attempts to increase the utilization of layered-structure cathodes toward their theoretical capacities of about 280 mAh/g by using higher voltages cause an increased rate of capacity fade and resistance growth, and, thus, poorer cell performance.

Approaches to circumvent the challenges accompanying cathode performance degradation at high voltages include (i) improving cathode phase stability by coating the surface of cathode particles, (ii) fabricating structure doped Ni-rich cathodes, (iii) designing and synthesizing intrinsically stable electrolytes to tolerate high voltages, and (iv) developing electrolyte additives to stabilize the electrode/electrolyte interphase (SEI) layer. Doping or partial substitution is one of the approaches for enhancing the structural and thermal stabilities of Ni-rich NMC or Ni-rich NCA cathodes. A wide range of cation dopants (or substitution atoms), such as Al, Mg, Ti, Mo, Nb, and Na, have been incorporated into Ni-rich cathode materials to enhance their stability.

While NCA and NMC cathodes are often utilized in batteries, the expensive and toxic Co element raises the cost of the cells and production process, hindering the mass production of EVs. LiFePO$_4$ (LFP), though it displays high safety and cycling performance, its low volume specific energy and complicated production process bring difficulties to the reduction of the vehicle size and battery cost, respectively. Spinel LiMn$_2$O$_4$ may be used as a cathode material in both EVs and PHEVs, and is generally safer and less toxic than NCA and NMC because it does not contain Co. However, its energy density is low and the material exhibits poor high-temperature stability. Spinel LiNi$_{0.5}$Mn$_{1.5}$O$_4$ is a candidate material for high energy density lithium-ion batteries used in EVs, but one barrier for the successful commercialization of this material in commercial Li-ion batteries is the electrolyte decomposition and concurrent degradation reactions at the cathode/electrolyte interfaces at high voltages.

In accordance with the present disclosure, a cobalt-free cathode is described capable of performing at voltages above 4.5 V vs Li/Li+ and containing at least Li, Mn, Ni, Sb, and O in its structure. Some example advantages of using this cathode structure include 1) increased energy density (energy density=capacity*voltage); 2) increased operating voltage range (the resulting cathodes can operate at high voltages of more than 5.3 V); 3) increased capacity (for example, LiNi$_{1-x}$Sb$_x$O$_2$ (x=0.2) has a discharge specific capacity of about 102 mAh/g, and the first example below has the 1$^{st}$ cycle discharge specific capacity of more than 120 mAh/g); and 4) reduced cost (Cobalt is nearly 5 times more expensive than Antimony, for example).

Figure 2:
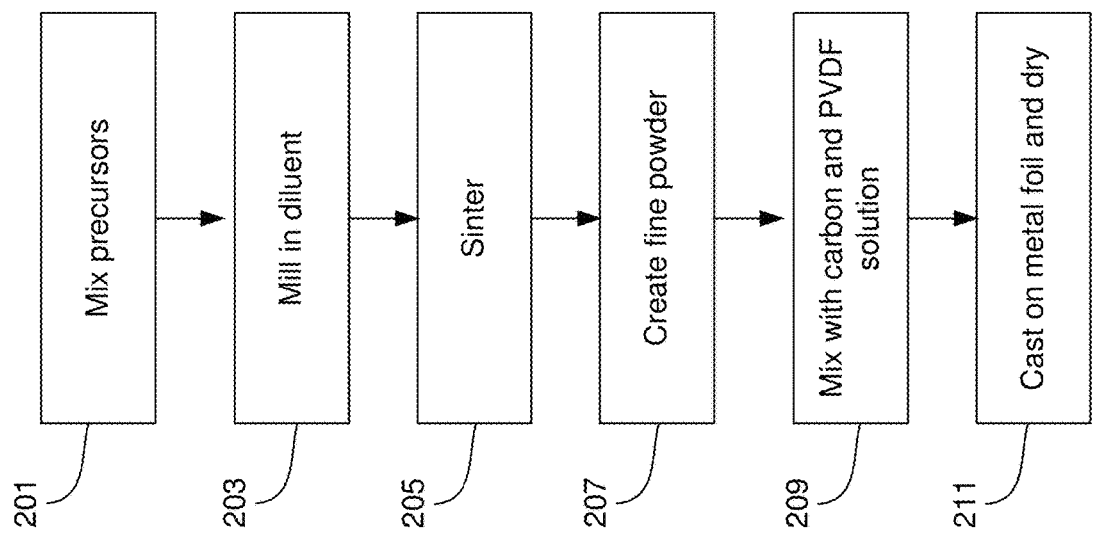
FIG. 2 illustrates a process flow for fabricating a cobalt-free cathode, In accordance with an example embodiment of the disclosure.

FIG. 2 illustrates a process flow for fabricating a cobalt-free cathode, in accordance with an example embodiment of the disclosure. Referring to FIG. 2, the process starts in step 201, where the precursors listed in Table 1 are mixed before proceeding to step 203, where the precursors may be ball-milled in a diluent. This example combination of precursors may be modified with different ratios of antimony and/or manganese versus the lithium and nickel compounds, and in some cases, excess lithium in the cathode may be desirable. For example, the cathode material may have excess lithium of 5-30% above the stoichiometric level of lithium. In an aspect, the cathode material may have the general formula, ANi$_{(1-x)}$Mn$_x$SbO$_y$, where x is a number between 0.0 and 1.0, y is an integer, and A comprises one or more of lithium, sodium, and potassium. In embodiments of this aspect, A may comprise lithium, including 5-30% excess lithium, for example Li$_{1.05-1.3}$Ni$_{(1-x)}$Mn$_{(x-(0.05-0.3))}$SbO$_y$.

TABLE 1

| Example precursors used for the synthesis of a cobalt-free cathode | | |
|---|---|---|
| Li$_3$MnNiSbO$_6$ | Formula Weight | # of Moles |
| Li$_2$CO$_3$ | 73.89 | 1.5 |
| Manganese (II) Acetate | 173.03 | 1 |
| Antimony (III) Acetate | 298.89 | 1 |
| Ni(OH)$_2$ | 92.724 | 1 |

A ball mill may comprise a hollow cylindrical shell rotating about its access and partially filled with balls comprising steel or a ceramic such as alumina or zirconia, for example, and the cylindrical shell lined with an abrasion resistant material, such as manganese steel, ceramic, or rubber, for example. The precursors may be mixed with a diluting agent, a diluent, in the ball mill to enable better flow of the materials. The ball mill may grind the materials into a fine powder for further processing.

In step 205, the resulting material may be sintered between 600 to 800 degrees C., for example, to obtain crystalline material.

The sintered material may then be made into a fine powder in step 207, in a mechanical milling or grinding process, for example, and mixed with carbon black and polyvinylidene fluoride (PVDF) solution to form a cathode slurry in step 209. The slurry may then be casted on an aluminum foil and dried in step 211 to form a cathode electrode. The casting may comprise a gap extrusion or blade casting technique, for example. Blade casting may comprise applying the slurry to a foil substrate by using a flat surface, such as a blade, which may be controlled to be a certain distance above the substrate. The blade may be passed over the slurry to spread it over the substrate, with the thickness controlled by the gap distance. For gap extrusion, the process may comprise a molten phase extrusion of solids without solvents, or slot die coating which is typically done with a solvent dissolving the polymer that is pushed out of a slot. The resulting cathode may be utilized in the fabrication of a battery with an anode, separator, and current collectors, such as the battery 100 described with respect to FIG. 1 for example.

The above process results in an alkali metal comprising at least manganese, nickel, and antimony, where the alkali metal may comprise lithium, sodium, or potassium, for example, or mixtures and combinations of these alkali metals. This material may be fabricated as the cathode in a battery while an alkali metal, silicon, carbon, lithium, or combinations of these materials may be used as the anode. The cathode material may be represented by $ANi_{(1-x)}Mn_xSbO_y$, where A is one of lithium, sodium, or potassium, or mixtures and/or combinations thereof. In an example scenario, in a battery with cathode material comprising: $0.05<x<0.9$ and $1.0<y<8$, a resulting specific capacity of >50 mAh/g for the cathode active material is demonstrated. In another example scenario, in a battery with cathode material comprising: $0.4<x<0.6$ and $1.0<y<8$, a resulting specific capacity of >70 mAh/g for the cathode active material is demonstrated. In yet another example embodiment, the cathode material may be doped with a transition metal oxide element or a non-transition metal oxide element. The electrochemical performance of the $ANi_{(1-x)}Mn_xSbO_y$ electrode against lithium metal foil is shown in FIG. 3.

Figure 3:
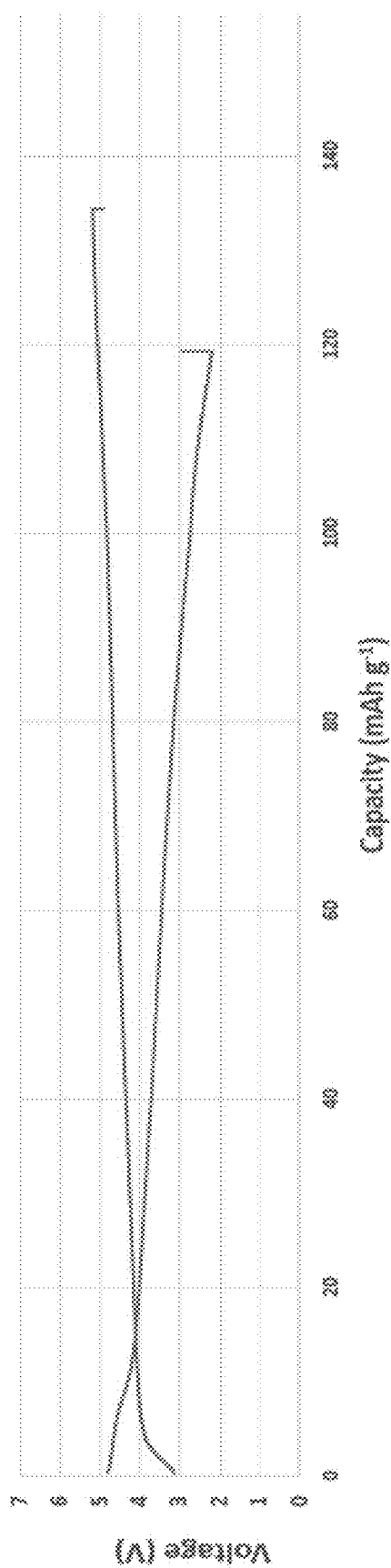
FIG. 3 illustrates the cycle voltage profile of a battery with cobalt-free cathode, in accordance with an example embodiment of the disclosure.

FIG. 3 illustrates the cycle voltage profile of a battery with cobalt-free cathode, in accordance with an example embodiment of the disclosure. Referring to FIG. 3, there is shown a 1st cycle voltage profile of a cathode fabricated as described above with respect to FIG. 2. The cathode is cycled against lithium metal foil and demonstrates ~120 mAh/g specific capacity. The cathodes contain about 70 wt % active materials, 20 wt % carbon black, and 10 wt % PVDF, and are coated on 15 µm Al foil. The initial cycle efficiency of the cell is approximately 90%, which is significantly higher than typical silicon anode lithium-ion batteries.

Figure 4:
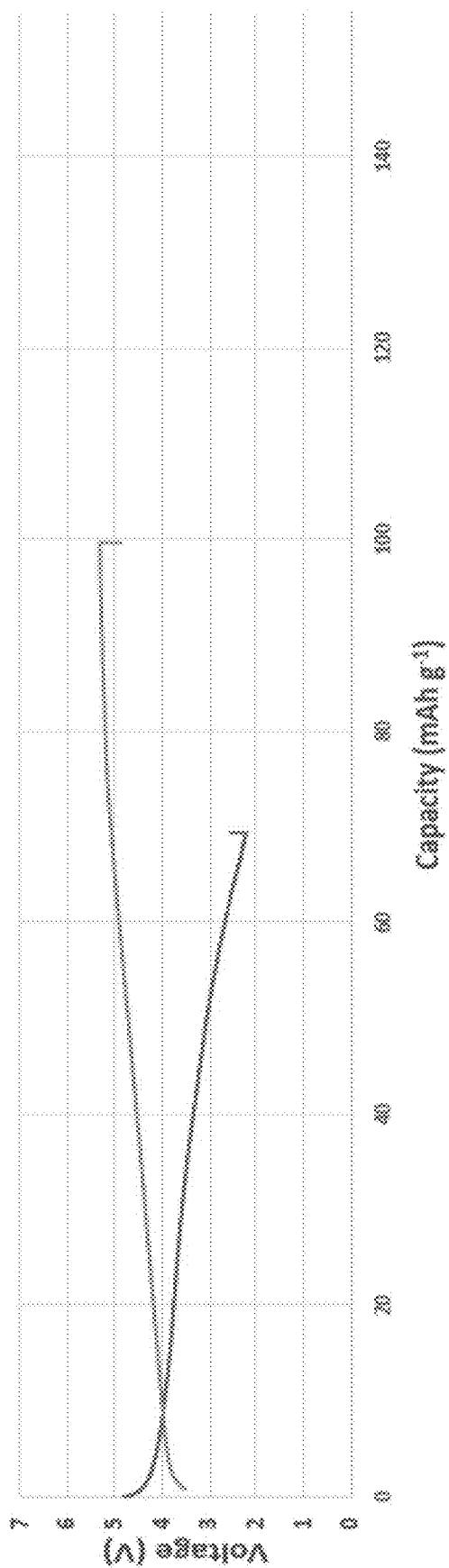
FIG. 4 illustrates the cycle voltage profile of a battery with cobalt-free and reduced antimony cathode, in accordance with an example embodiment of the disclosure.

FIG. 4 illustrates the cycle voltage profile of a battery with cobalt-free and reduced antimony cathode, in accordance with an example embodiment of the disclosure. Referring to FIG. 4, there is shown a 1st cycle voltage profile of a cathode fabricated as described above with respect to FIG. 2 for example, but with the amount of Sb reduced by (at least approximately) 50%. The lithium manganese nickel antimony oxide cathode half-cell with half the amount of source antimony resulted in a ~40% reduction in the capacity of the developed cathode compared to the higher antimony material of FIG. 3, resulting in a specific capacity of ~70 mAh/g. The cathodes contain about 70 wt % active materials, 20 wt % carbon black and 10 wt % PVDF, and are coated on 15 µm Al foil.

Figure 5:
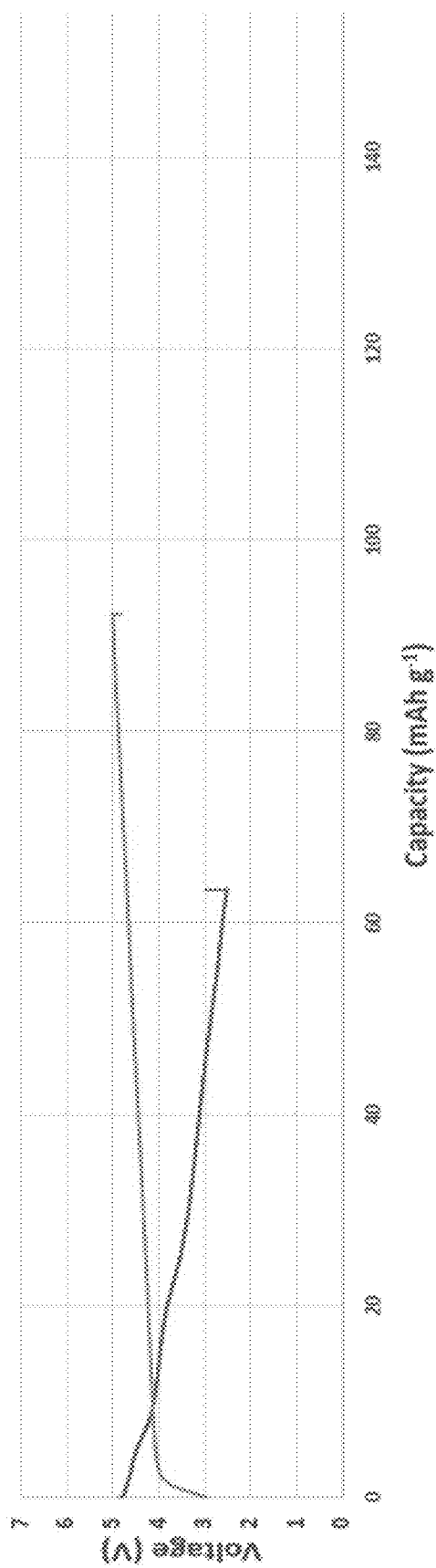
FIG. 5 illustrates the cycle voltage profile of a battery with cobalt-free and reduced manganese cathode, in accordance with an example embodiment of the disclosure.

FIG. 5 illustrates the cycle voltage profile of a battery with cobalt-free and reduced manganese cathode, in accordance with an example embodiment of the disclosure. Referring to FIG. 5, there is shown a 1st cycle voltage profile of a cathode fabricated as described above with respect to FIG. 2 for example, but with the amount of manganese reduced by (at least approximately) 20%. The lithium manganese nickel antimony oxide cathode half-cell with 20% the amount of Mn resulted in a ~50% reduction in the capacity of the developed cathode compared to the first example in FIG. 3, resulting in a specific capacity of ~65 mAh/g. The cathodes contain about 70 wt % active materials, 20 wt % carbon black and 10 wt % PVDF, and are coated on 15 µm Al foil.

Figure 6:
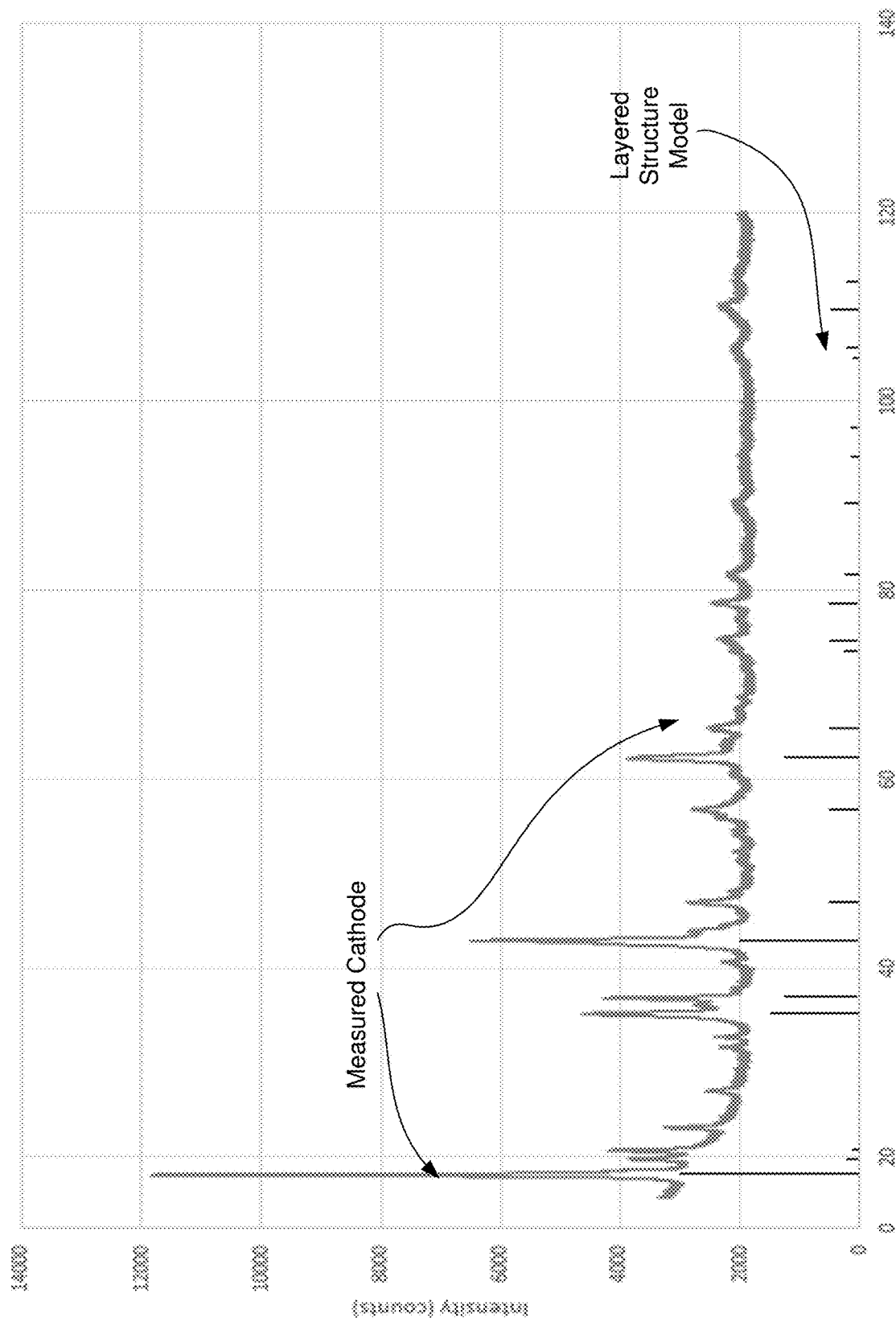
FIG. 6 illustrates x-ray diffractometer data for a lithium manganese nickel antimony oxide layered structure cathode, in accordance with an example embodiment of the disclosure.

FIG. 6 illustrates x-ray diffractometer data for a lithium manganese nickel antimony oxide layered structure cathode, in accordance with an example embodiment of the disclosure. Referring to FIG. 6, there is shown intensity versus angle x-ray data for a cathode fabricated as disclosed above with respect to FIGS. 2 and 3 for example. As can be seen by the layered structure modeled data (vertical lines on the x-axis below the measured x-ray data), the overall structure matches very well with the model, indicating a good quality layered cathode structure. In addition, the narrow peak widths indicate good material quality.

In an example embodiment of the disclosure, a method and system is described for an ultra-high voltage cobalt-free cathode for alkali ion batteries. The system may comprise an anode, a cathode, and a separator, with the cathode comprising an active material $ANi_{(1-x)}Mn_xSbO_y$, where x is a number between 0.0 and 1.0, y is an integer, and A comprises one or more of lithium, sodium, and potassium. The anode may include one or more of an alkali metal, silicon, and carbon. In one example, x is a value in the range between 0.05 and 0.9 ($0.05<x<0.9$) and y is a value in the range between 1 and 8 ($1<y<8$) where a specific capacity of the cathode active material is greater than 50 milliamp-hours per gram. In another example, x is a value in the range between 0.4 and 0.6 ($0.4<x<0.6$) and y is a value in the range between 1 and 8 ($1<y<8$), where a discharge specific capacity of the cathode active material is greater than 70 mAh/g. The active material may be doped with a transition metal oxide or a non-transition metal oxide. In another example, x=0.2, y=2, and a discharge specific capacity of the cathode active material is greater than 120 milliamp-hours per gram. The cathode active material may operate at a voltage of more than 4.5 V vs Li/Li+.

In another example embodiment, a method and system is described for an ultra-high voltage cobalt-free cathode for alkali ion batteries. The battery may comprise an anode, a cathode, and a separator, where the cathode may comprise an active material $ANi_{(1-x)}Mn_xSbO_y$, where x is a number between 0.0 and 1.0, y is an integer, and A comprises one or more of lithium, sodium, and potassium. The anode may comprise one or more of: an alkali metal, silicon, and carbon. The separator may comprise an electrically insulating polymer.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An active material for use in a battery, the active material comprising:
$A_{1.a-1.b}Ni_{(1-x)}Mn_{(x-(0.a-0.b))}SbO_y$, where x is a number greater than 0.0 and less than 1.0 (0.0<x<1.0), y is an integer, a and b are greater than 0, a is less than b, A comprises one or more of lithium, sodium, and potassium, and a total combined value of a number of A, a number of Ni, and a number of Mn is 2.0, and wherein the active material comprises an excess of a % to b % above a stoichiometric level of A.

2. The active material of claim 1, wherein the active material is used in a battery comprising an anode, a separator, and an electrolyte.

3. The active material according to claim 2, wherein the electrolyte comprises a liquid, solid, or gel.

4. The active material according to claim 2, wherein the anode comprises one or more of: an alkali metal, silicon, and carbon.

5. The active material according to claim 1, wherein 0.05<x<0.9 and 1<y<8.

6. The active material according to claim 5, wherein a discharge specific capacity of the active material on a conductive material to form an electrode is >50 milliamp-hours per gram.

7. The active material according to claim 1, wherein 0.4<x<0.6 and 1<y<8.

8. The active material according to claim 7, wherein a discharge specific capacity of the active material on a conductive material to form an electrode is >70 milliamp-hours per gram.

9. The active material according to claim 1, wherein the active material is doped with a transition metal oxide or a non-transition metal oxide.

10. The active material according to claim 1, wherein the active material comprises a 5 to 30% excess of lithium, such that the active material has a formulation of $Li_{1.05-1.3}Ni_{(1-x)}Mn_{(x-(0.05-0.3))}SbO_y$.

11. The active material according to claim 1, wherein x=0.2, y=2, and a discharge specific capacity of the active material on a conductive material to form an electrode is greater than 100 milliamp-hours per gram.

12. The active material of claim 1, wherein the active material operates at a voltage of more than 4.5 volts vs Li/Li+.

13. A battery, the battery comprising:
an anode, a cathode, and a separator, wherein:
the cathode comprises an active material $A_{1.a-1.b}Ni_{(1-x)}Mn_{(x-(0.a-0.b))}SbO_y$, where x is a number greater than 0.0 and less than 1.0 (0.0<x<1.0), y is an integer, a and b are greater than 0, a is less than b, A comprises one or more of lithium, sodium, and potassium, and a total combined value of a number of A, a number of Ni, and a number of Mn is 2.0, and wherein the active material comprises an excess of a % to b % above a stoichiometric level of A.

14. The battery according to claim 13, wherein the electrolyte comprises a liquid, solid, or gel.

15. The battery according to claim 13, wherein the anode comprises one or more of: an alkali metal, silicon, and carbon.

16. The battery of claim 13, wherein the active material comprises a 5 to 30% excess of lithium, such that the active material has a formulation of $Li_{1.05-1.3}Ni_{(1-x)}Mn_{(x-(0.05-0.3))}SbO_y$.

17. The battery according to claim 13, wherein 0.05<x<0.9 and 1<y<8.

18. The battery according to claim 17, wherein a specific capacity of the active material is >50 milliamp-hours per gram.

19. The battery according to claim 13, wherein 0.4<x<0.6 and 1<y<8.

20. The battery according to claim 19, wherein a specific capacity of the active material is >70 milliamp-hours per gram.

21. The battery according to claim 13, wherein the active material is doped with a transition metal oxide or a non-transition metal oxide.

22. The battery according to claim 13, wherein x=0.2, y=2, and a discharge specific capacity of the active material is greater than 100 milliamp-hours per gram.

23. The battery of claim 13, wherein the active material operates at a voltage of more than 4.5 volts vs Li/Li+.

24. The battery of claim 13, wherein the cathode comprises about 70 wt % of the active material, 20 wt % carbon black and 10 wt % polyvinylidene fluoride (PVDF).

25. The battery of claim 13, wherein the cathode is coated on 15 μm Al foil.

* * * * *